Sept. 8, 1931.  H. A. SELAH  1,821,949

CONDUIT FITTING

Filed May 24, 1926

INVENTOR.
Howard A Selah
BY
ATTORNEYS.

Patented Sept. 8, 1931

1,821,949

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed May 24, 1926. Serial No. 111,250.

This invention is designed to improve conduit fittings, and particularly such fittings where it is desired to carry the wires to a single fixture and particularly where the fixture is supported directly by the fitting. One of the principal objects of the invention relates to so shaping the fitting as to add to the ease with which the wires may be passed into and out of the fitting. Features and details of the invention will appear more fully from the specification and claim.

The invention is illustrated in the accompanying drawings as follows:—

Figure 1:
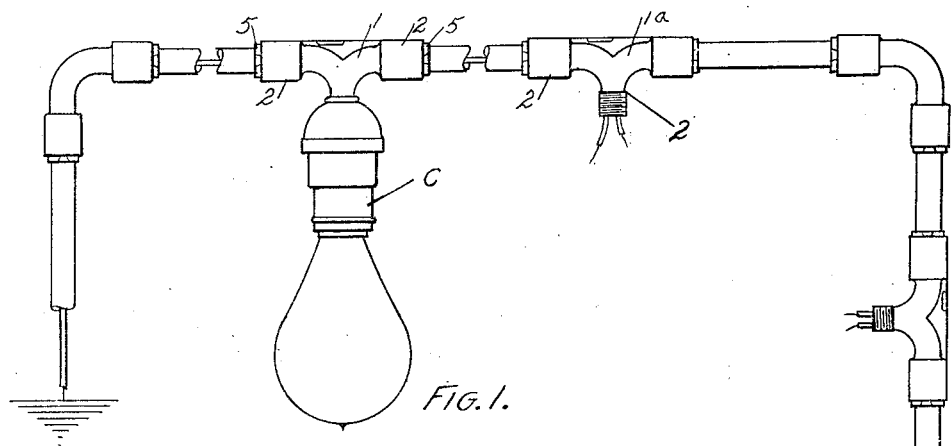

Fig. 1 shows an elevation of a conduit system.

Figure 2:
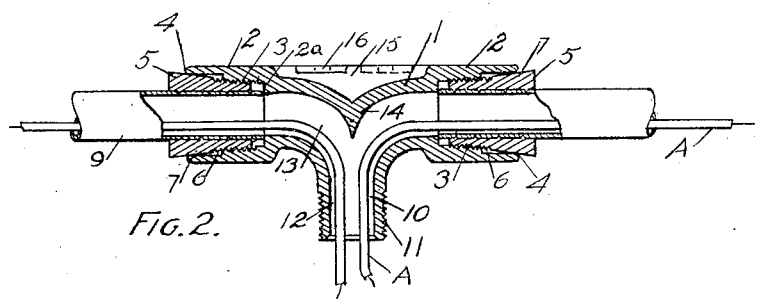

Fig. 2 a central section through one of the fittings.

Figure 3:
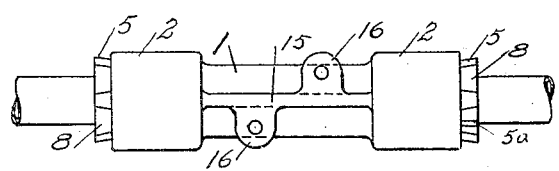

Fig. 3 a plan view.

Figure 4:
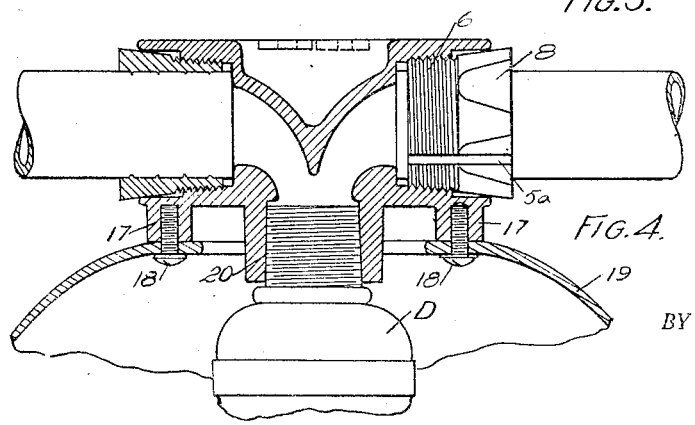

Fig. 4 an enlarged view of the fitting slightly differing in structure from that shown in Fig. 2.

1 marks the body of the fitting. This has the extensions 2 at each end, these extensions being provided with conduit openings. Internal screw threads 3 are arranged in the extensions and a surrounding engaging surface 4 is provided at the outer ends of the extension.

Clamping sleeves 5 are made collapsible by means of a slot 5a and they have the screw threads 6 engaging the screw threads 3, the tapered intermediate portion 7 engaging the surfaces 4 and a wrench-hold portion 8 by means of which the sleeve may be turned into place so as to engage and clamp an inserted conduit, or fitting 9. These are arranged at each end of the fitting.

A side opening 10 is provided with external screw threads 11 adapted to receive a fixture, such as a clamp C. The passage 12 of the side opening communicates with the passages 13 which extend from the conduit openings. The passages 13 are deflected toward the passage 12 by the deflecting projection 14 extending from the wall of the fitting opposite the side passage 12. Guard shoulders 2a are provided at the inner ends of the extension so that the ends of the fitting are guarded. A conductor wire A if fed into the opening at the end of the fitting is deflected by the deflector 14 into the passage 13 and out into the conduit. This simplifies the leading in of the wires very much in this type of structure. Further the structure gives such rigidity that to a very large extent the conduit itself may be used as a frame-work for carrying the fixtures. It will be understood that this is particularly applicable to lighting fixtures and such articles working in series in which the wire is carried into and out of the operating fixtures, such as a lighting fixture as shown. In such constructions as at present formed ordinary boxes are used involving covers and similar devices. It will be understood that the side opening may be provided with a threadless coupling and fitting in the same manner as the ends and at least one of the bodies 1a has its side opening so arranged.

The body of the fitting is provided with a web 15 in the gore formed between the bends leading to the side opening and this has a perforated foot 16 by which it may be secured, if desired. It will be noted that by placing these feet on the web in the gore clearance may be obtained for the insertion of the screw while the feet extend laterally only to the extent of the thickness of the fitting itself. Thus a very compact structure is provided.

In the construction shown in Fig. 4 the side opening has the internal screw threads 20 as distinguished from the external threads and is adapted to receive a fixture in the form of a lamp D. The fixture is also provided with the screw-threaded lugs 17 into which screws 18 are passed for securing a shade or fixture as 19.

What I claim as new is:—

A conduit fitting comprising a body having conduit openings therein and a side opening, the conduit openings making a bend to the side opening leaving a gore between the bends; a web in the gore; and feet extending at right angles to the web having screw-receiving openings, the major portion of the feet being within the cross dimension of the body of the fitting.

In testimony whereof I have hereunto set my hand.

HOWARD A. SELAH.